United States Patent [19]

Davenport et al.

[11] Patent Number: 4,868,718
[45] Date of Patent: Sep. 19, 1989

[54] FORWARD ILLUMINATION LIGHTING SYSTEM FOR VEHICLES

[75] Inventors: John M. Davenport, Lyndhurst; William W. Finch, Richmond Heights; Richard L. Hansler, Pepper Pike, all of Ohio

[73] Assignee: General Electric Company, Schenectady, N.Y.

[21] Appl. No.: 322,607

[22] Filed: Mar. 13, 1989

[51] Int. Cl.$^4$ .............................................. F21V 7/04
[52] U.S. Cl. .................................... 362/32; 350/96.18
[58] Field of Search ............... 362/32; 350/96.18, 96.1

[56] References Cited

U.S. PATENT DOCUMENTS 4,475,788 10/1984 Tomassini et al. ............. 350/96.18

FOREIGN PATENT DOCUMENTS

2205969 12/1988 United Kingdom ............. 350/96.18

Primary Examiner—Carroll B. Dority
Attorney, Agent, or Firm—John P. McMahon; Stanley C. Corwin; Fred Jacob

[57] ABSTRACT

A lighting subsystem is disclosed that uses optical devices to alter, the actual or apparent optical position of the ends of optical fibers coupled to a high intensity light source so as to provide all of the forward illumination needs for a vehicle. In one embodiment, optical wedges are interposed between a rectangular array of optical fibers and an array of lens elements mountable on the front of a vehicle from which the forward illumination is transmitted therefrom. The imposition of the optical devices alters the actual or apparent optical position of the fibers relative to the lenses and thereby changes the forward illumination from its low to its high beam pattern, to a fog beam illumination or to a cornering illumination pattern. In another embodiment, flat shaped optical members are rotated to provide the various forward illumination needs of the vehicle.

5 Claims, 6 Drawing Sheets

FORWARD ILLUMINATION LIGHTING SYSTEM FOR VEHICLES

BACKGROUND OF THE INVENTION

The present invention relates to a lighting system having a moveable optical member arranged between lens elements mounted across a vehicle and optical fibers emitting light from one of their ends which is generated by a high brightness light source, wherein the movement of the optical member alters the apparent optical position of the fibers relative to the lens elements in such a manner so as to provide all of the forward illumination needs of the vehicle.

U.S. patent application Ser. No. 123,844 filed Nov. 23, 1987 assigned to the same assignee as the present invention, now U.S. Pat. No. 4,811,172 herein by reference, discloses a lighting system that utilizes a high brightness light source which is coupled to fiber optics. In one embodiment, the lighting system includes two high intensity light sources which are respectively coupled to a first and a second plurality of optical fibers. Both pluralities of optical fibers are positioned relative to lens members mounted across a vehicle. The first high intensity light source provides the low beam forward illumination of the vehicle and the light from the second high intensity light source provides the high beam forward illumination of the vehicle. Although the lighting system disclosed in Ser. No. 123,844, now U.S. Pat. No. 4,811,172, serves well the needs of the vehicle, it is desired that a lighting system be provided that needs only one high intensity light source while still providing both the low beam and high beam forward illumination needs of the vehicle.

Accordingly, it is an object of the present invention to provide a lighting system that utilizes only one high intensity light source while still providing high and low beam forward illumination for a vehicle.

It is a further object of the present invention to have the one high intensity light source also provide the forward directional illumination associated with the cornering lights and fog beam illumination of the vehicles.

SUMMARY OF THE INVENTION

The present invention is directed to a lighting system having an optical member which is moveable in such a manner so as to provide all of the forward illumination needs for a vehicle that is generated by a single high intensity light source.

The lighting system comprises the high intensity light source capable of being selectively energized, a plurality of optical carrying devices, a plurality of lens elements positioned relative to the ends of the respective optical carrying devices, and a moveable optical device interposed between the ends of the optical carrying devices and lens elements. The optical carrying devices each have one end predeterminately coupled to the light source with the other end emitting light when the high intensity light source is energized. The moveable device is preferably of a transparent material of a predetermined thickness and having a predetermined index of refraction with its imposition altering the apparent optical position of the optical carrying devices relative to the lens elements.

DETAILED DESCRIPTION OF THE PREFERRED EMBODIMENTS

Figure 1:
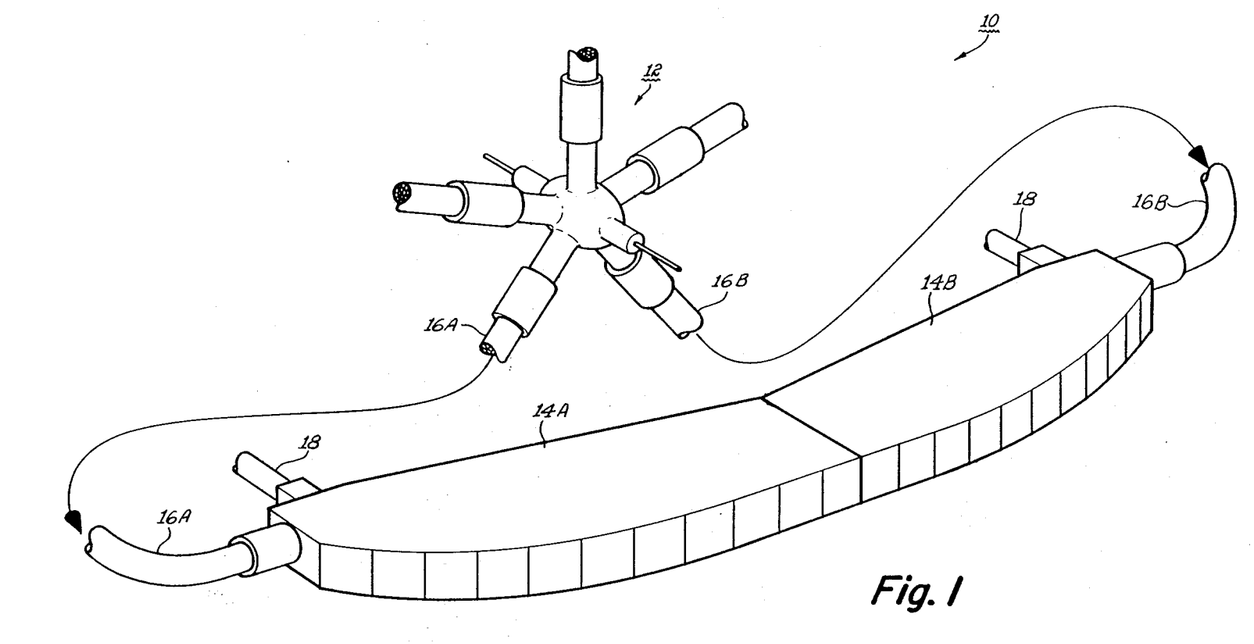
FIG. 1 is a schematic illustration of one embodiment of the present invention related to a lighting system that provides the forward illumination including cornering illumination of a vehicle.

Referring to the drawing, FIG. 1 illustrates a lighting system 10 of the present invention that is particularly suited to provide the forward illumination including the cornering and fog beam illumination needs for aerodynamically styled vehicles.

The lighting system 10 has a high intensity light source 12 that provides all of the lumens to serve the forward, rearward, and interior illumination needs for a vehicle. The present invention is primarily related to providing the forward illumination of the vehicles and therefore the facilities of the light source 12 related to such illumination is only to be described. The light source 12 may be of the type described in U.S. patent application Ser. No. 266,129 pending, filed Nov. 2, 1988, assigned to the same assignee of the present invention, and herein incorporated by reference.

The low and high beam forward illumination along with the cornering and fog beam illumination of the vehicle is provided by illumination devices 14A and 14B that are respectively coupled to light source 12 by means of optical carrying devices 16A and 16B. The illuminating devices 14A and 14B, each have a connector 18 that routes electric power to an electrically activated device 20 to be described with regard to FIG. 2. The optical carrying devices 16A and 16B may have various embodiments which are described in previously mentioned Application Ser. No. 266,129.

Figure 2:
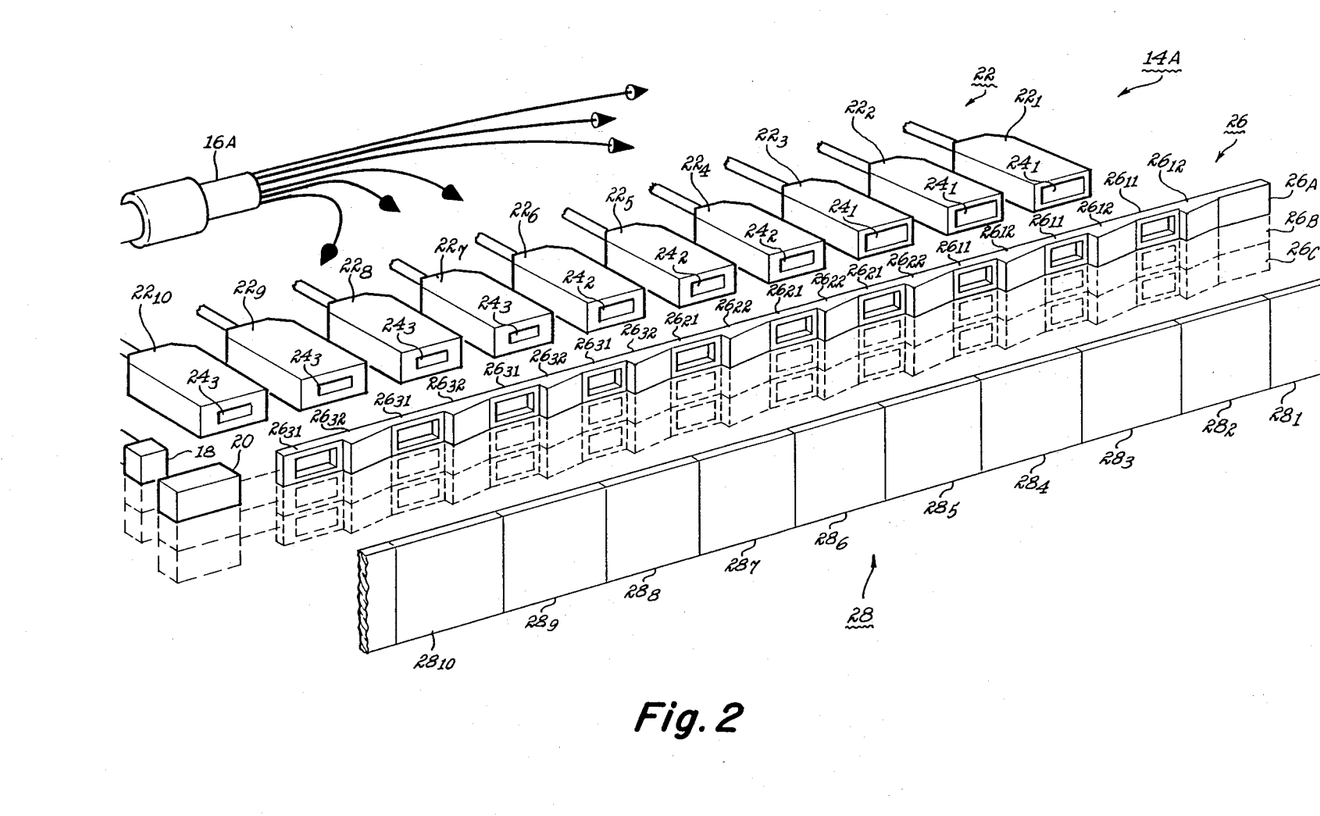
FIG. 2 illustrates an arrangement of an illumination device related to the present invention.

The illumination devices 14A and 14B each have an arrangement that is shown in more detail in FIG. 2 for illuminating device 14A. FIG. 2 shows an arrangement of the elements tabulated in Table 1.

TABLE 1

| Optical Carrying Connectors | Rectangular Array | Moveable Member | | Lens Elements |
|---|---|---|---|---|
| $22_1$ | $24_1$ | $26_{11}$ | $26_{12}$ | $28_1$ |
| $22_2$ | $24_1$ | $26_{11}$ | $26_{12}$ | $28_2$ |
| $22_3$ | $24_1$ | $26_{11}$ | $26_{12}$ | $28_3$ |
| $22_4$ | $24_2$ | $26_{21}$ | $26_{22}$ | $28_4$ |

TABLE 1-continued

| Optical Carrying Connectors | Rectangular Array | Moveable Member | | Lens Elements |
| --- | --- | --- | --- | --- |
| $22_5$ | $24_2$ | $26_{21}$ | $26_{22}$ | $28_5$ |
| $22_6$ | $24_2$ | $26_{21}$ | $26_{22}$ | $28_6$ |
| $22_7$ | $24_3$ | $26_{31}$ | $26_{32}$ | $28_7$ |
| $22_8$ | $24_3$ | $26_{31}$ | $26_{32}$ | $28_8$ |
| $22_9$ | $24_3$ | $26_{31}$ | $26_{32}$ | $28_9$ |
| $22_{10}$ | $24_3$ | $26_{31}$ | $26_{32}$ | $28_{10}$ |

FIG. 2 partially illustrates the illumination device 14A as comprising an arrangement of connectors 22, an optical member 26 and lens elements 28. The connector arrangement 22 is comprised of a plurality of connectors $22_1$, $22_2$ ... $22_n$ which lodges the fiber optical cables branched off from the optical carrying device 16A. The ends of the fiber optics of the connectors $22_1$ ... $22_n$ emit light through respective apertures $24_1$ ... $24_2$ or $24_3$ given in Table 1. FIG. 2 further partially illustrates illumination device 14A as comprising an optical member 26 having a plurality of sections $26_{11}$, $26_{12}$ ... $26_{nn}$ some of which are tabulated in Table 1, and a plurality of lens elements $28_1$, $28_2$ ... $28_n$, some of which are also tabulated in Table 1. The optical member 26 may have three embodiments $26_A$, $26_B$ (shown in phantom), and $26_C$ (shown in phantom) that may be respectively related to the low/high beam illumination, concerning illumination and fog beam illumination each of a vehicle. For such embodiments, the light emitted from the connectors may be shared by the three arrangement by means of appropriate upward, downward, or sideward movement of device 20 or separate connectors (not shown) may be provided for each such arrangement.

For the embodiment shown in FIG. 2, the three apertures, $24_1$, $24_2$, and $24_3$ are of increasing relative dimensions. Such an arrangement of apertures provides a tapered array of which the maximum light of illumination device 14A is transmitted from optical devices of $22_1$, $22_2$, $22_3$, with a lesser amount from optical devices of $22_4$, $22_5$, $22_6$, and then with an even lesser amount from devices of $22_7$, $22_8$, $22_9$ and $22_{10}$. The lens elements $28_1$ ... $28_n$ that cooperate with the optical fibers of $22_1$ ... $22_n$ may be of the type described in U.S. patent application Ser. No. 266,129.

The principles of the present invention are particularly related to the optical member 26 that is connected to the device 20 which may be actuated and moveably position the associated section $26_{11}$ ... $26_{nn}$ of members $26_A$, $26_B$ and $26_C$. The device 20, having applied to it the electric power of connector 18, may cause the sections $26_{11}$ ... $26_{nn}$ to be moved in a sideward, upward or downward manner so that, for example, sections $26_{11}$, $26_{21}$ and $26_{31}$ are first interposed between the connectors 22 and the lens elements 28, and then sections $26_{12}$, $26_{22}$ and $26_{23}$ are so interposed. The related sections $26_{11}$, $26_{21}$ and $26_{31}$ of $26_A$ of FIG. 2 have a clear opening to allow light to pass therethrough unimpeded, whereas, related sections $26_{12}$, $26_{22}$ and $26_{32}$ are of a transparent medium, such as glass or plastic devoid of any opening. The imposition of the moveable device $26_A$, in particular $26_{12}$, $26_{22}$ and $26_{32}$, alter the apparent or optical position of the related optical devices of connectors 22 relative to the lens elements 28 which alteration may be first described with reference to FIG. 3.

Figure 3:
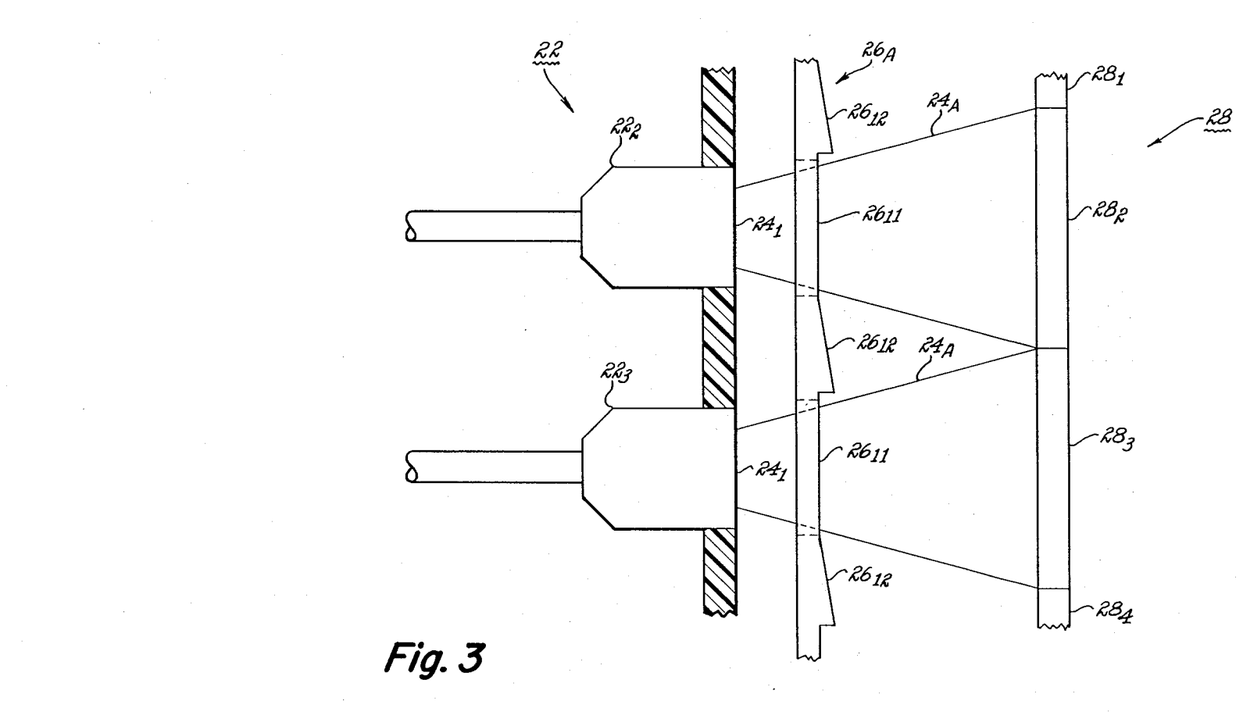
FIG. 3 is a top-view which illustrates an arrangement of the connectors housing optical fibers, a moveable optical member, and lens elements all related to the present invention.

FIG. 3 is a top-view which illustrates two light beam patterns $24_A$ that are transmitted from the rectangle aperture $24_1$ of optical connectors $22_2$ and $22_3$ The beam patterns $24_A$ each pass through the opened portion of flat section $26_{11}$ of optical member $26_A$ and impinge upon respective lens elements $28_2$ and $28_3$. The flat section $26_{11}$ of $26_A$ is interposed between the optical fibers of connector 22 and lens element 28 and is related to the generation of the low beam pattern of the forward illumination of the vehicle. The interaction of the other related section of member 26 such as $26_{12}$ having a wedge shape may be described with reference to FIG. 4.

Figure 4:
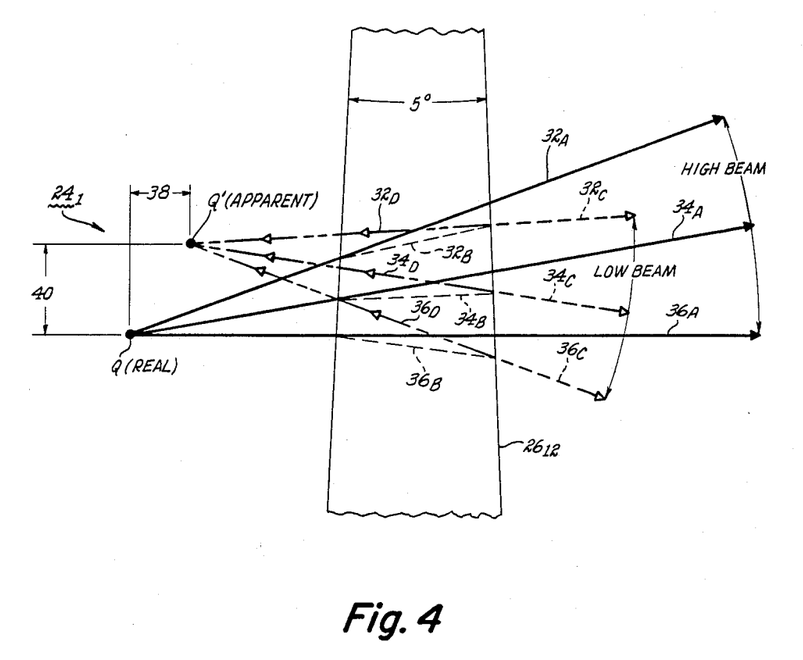
FIG. 4 primarily illustrates the interrelationship between a wedge member and the real and apparent position of the ends of the optical fibers relative to lens elements which are involved in generating the low and high beam illumination related to the present invention.

FIG. 4 illustrates a portion of the optical wedge member $26_{12}$ that is interposed between the light rays related to beam pattern $24_A$ and the lens element $28_2$. The wedge member $26_{12}$ has a predetermined wedge angle shown in FIG. 4, for example, as 5°. The amount of deviation between the incident light rays striking the wedge member $26_2$ and those rays which are refracted before emerging from wedge member $26_2$ is a function of the wedge angle, the thickness, and the index of refraction, all of wedge member $26_2$. The wedge angle, thickness, and index of refraction of the wedge number $26_{12}$ may have respective ranges of about 3 to 30 35 degrees; 1 to 10 mm; and 1.3 to 1.8.

The practice of the present invention may first be described with reference to the operation of FIG. 4 devoid of a wedge member $26_{12}$, that is, the operation of light emitted from the aperture $24_1$ and passing directly through the open portion of related member $26_{11}$. For such an operation, a point source of light rays is illustrated at its real position Q as it is seen from or presented to lens element $28_2$. The point source Q is meant to represent the concentration of light emitted from central region of the aperture $24_1$. The point source Q generates a cone of light having an upper path $32_A$ (solid line), middle path $34_A$ (solid line), and lower path $36_A$ (solid line). The imposition of the wedge member $26_{12}$, by the activation of device 20 of FIG. 2, causes the position of the point source of FIG. 4 as it is seen or as presented to the lens $28_2$, to move from point Q(real) in an inward and upward manner to point Q'. The imposition of the wedge member $26_{12}$ causes the light rays to be refracted inward and downward by wedge member $26_{12}$ as represented by upper path $32_B$ (phantom), middle path $34_B$ (phantom) and lower path $36_C$ (phantom) which further continue on respectively as $32_C$, $34_C$ and $36_C$. The path of the light rays $32_C$, and $34_C$, and $36_C$ are representative of the low beam illumination pattern of a vehicle, whereas, the path of light rays $32_A$, $34_A$ and $36_A$ are representative of the high beam illumination. The Q' point of the emitting light rays related to the low beam pattern, is constructed by extending lines $32_D$, $34_D$ and $36_D$, from their respective locations $32_E$, $34_E$ and $36_E$ from which they emerge from wedge member $26_{12}$ back toward and intersecting at Q'. The point Q' forms the apparent position of the light rays related to the moveable wedge member $26_{12}$ of FIG. 4. The inward movement (Q to Q') is represented in FIG. 4 by a distance 38 in the range of about 1 mm to about 3 mm, whereas, the upward movement (Q to Q') is represented by a distance 40 in the range of about 2 mm to about 10 mm. The overall effect of the imposition of wedge member $26_{12}$ is to cause a slight shift in the focus of the lens. By choosing the distances properly, the low beam may be spread slightly and the high beam may be focussed more sharply.

Figure 5:
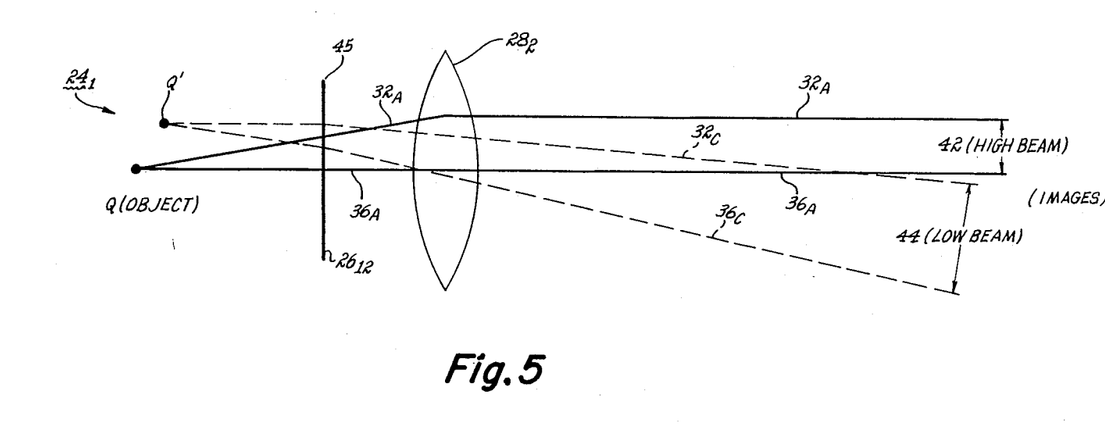
FIG. 5 illustrates the effect of the alteration of the apparent position of the optical fibers (object) related to the high and low beam (images) developed by the present invention.

The effect of the imposition of the optical wedge $26_{12}$ as it relates to the low and high beam patterns may be further described with reference to FIG. 5. FIG. 5 illustrates the optical effect related to forward illumination of a vehicle on the position of the image (high beam 42 or low beam 44) on changing the real position (Q) or apparent position (Q') of the object (central region of light emitted from aperture $24_1$). FIG. 5 is only representative of the light rays related to lens elements $28_2$, whereas, in actuality the light rays related to all of the lens elements $28_1 \ldots 28_n$, each generating a rectangular image, are superpositioned onto each other so as to form the composite low or high beam illumination pattern of the vehicle.

FIG. 5 illustrates the effect of the imposition of the wedge member $26_{12}$ at a location 44 in front of lens element $28_2$. The light rays being emitted from position Q are transmitted by lens element $28_2$ so as to form part of the high beam pattern 42, whereas, the light rays being emitted from position Q' are transmitted by lens element $28_2$ so as to form part of the low beam pattern 44. The paths related to the light rays of positions Q and Q' are as previously described with regard to FIG. 4.

The operation of FIGS. 2, 3, 4 and 5 related to the sections $26_{11}$, $26_{21}$ and $26_{31}$ having an opened portion to allow the light to be emitted from the ends of the optic fibers of connectors $22_1 \ldots 22_N$ is also applicable to such sections having a flat transparent portion for intercepting such emitted light with the exception being that the intercepted light rays are refracted downward and the apparent point source Q' is moved inward in a substantially horizontal manner relative to the real point source Q. The amount that the point source is altered from Q to Q' is a function of the thickness and index of refraction of the flat transparent sections $26_{11}$, $26_{21}$ and $26_{31}$.

Figure 6:
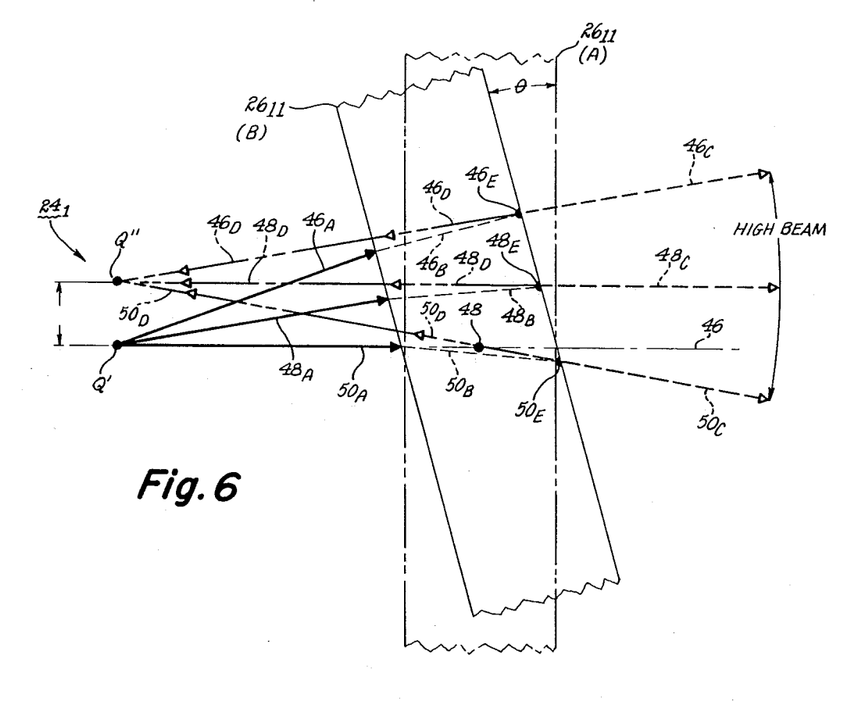
FIG. 6 illustrates the interrelationship between a rotating flat optical member altering the apparent optical position of the ends of the optical fibers involved in generating the low and high beam illumination related to the present invention.

The principles of the present invention that have been described for a wedge member $26_{12}$ are also applicable to a flat optical member which is rotated and may be described with reference to FIG. 6. FIG. 6 illustrates the imposition of a flat optical member $26_{11}$ (shown in phantom) between the connection region $24_1$ and the lens member $28_2$ (not shown) in a similar manner as previously described for wedge member $26_2$ of FIG. 4. The flat member $26_{11}$ is shown as positioned in a vertical manner (A) perpendicular to the optical axis 46 of lens $28_2$ (not shown) and causes the position of the light source of be alterated from Q (not shown) to Q'. The flat member $26_{11}$ is also shown (B) as rotated by an angle 0 relative to the center of rotation 48 of member $26_{11}$ positioned along the optical axis 46 of lens element $28_2$. The rotation of the member $26_{11}$ may be accomplished with an activation device similar to device 20 except that member $26_{11}$ is moved in a rotating manner rather than the linear movement of the wedge member $26_{12}$ previously described for device 20.

The light rays related to the point source Q' striking member $26_{11(B)}$ have an upper path $46_A$ (solid line) a middle path $48_A$ (solid line) and a lower path $50_A$ (solid line). The incident rays $46_A$, $48_A$ and $50_A$ encountering the rotated member $26_{11(B)}$ are refracted, respectively shown as rays $46_B$, $48_B$ and $50_B$ (all in phantom) and emerge therefrom as rays $46_C$, $48_C$ and $50_C$ (also all in phantom) respectively. The Q" point for the emitting light rays related to the rotated member $26_{11}(B)$ is constructed by drawing lines $46_D$, $48_D$ and $50_D$ back from locations $46_E$, $48_E$ and $50_E$, respectively, from which light these rays emerge therefrom and intersecting thereat their origin (Q").

The rotation of the flat member $26_1$ causes the apparent or optical position of the light rays emitted from the central region of aperture $24_1$ as presented to lens member $26_2$, to move Q' to Q". The overall effect of the imposition and rotation of optical member $26_{11}(B)$, is that the light rays emitted by the optical fibers at the central region of the aperture $24_1$ are directed inward so that the light pattern transmitted by lens $28_2$ may be altered from the low beam illumination to the high beam illumination of the vehicle. The illumination patterns generated by the operation of FIG. 6 are similar to the patterns of FIG. 5 previously discussed with regard to FIG. 4.

The practice of the present invention, hereinbefore described, for generating the low and high beam forward illumination is equally applicable for generating the forward illumination desired for the cornering lamps. For such cornering lamps, the high beam illumination described with regard to FIGS. 3, 4, 5 and 6 may be used as the direct light desired while the vehicle is proceeding in a direct manner, whereas, the low beam illumination described with regard to FIGS. 3, 4, 5 and 6 may be used as the spread light desired while the vehicle is proceeding through a curve or in a turning manner. The activation of a device related to the cornering lumination may be similar to device 20 associated with the wedge member $26_{12}$. The activation of such a device may be accomplished by motion sensing means that anticipates the turning of a vehicle so that the cornering lamps may then generate the spread beam illumination pattern.

The cornering illumination may be developed by choosing the appropriate parameters and cooperation of device 20, optical member $26_B$ and lens elements $28_1 \ldots 28_N$ all generally illustrated in FIG. 2. For example, the lens elements 28 located in the frontal area near each side portion of the vehicle may be selected to transmit the cornering illumination, and connectors 22 proximate to the selected lens elements may be selected to supply the related generated light, whereas, the associated sections of optical member 26B, similar to $26_{11}$ and $26_{12}$ previously described, may have appropriate parameters selected to develop the desired cornering illumination. For such illumination, the operation of device 20 is selected so that optical member $26_B$ is the moved in and out of imposition with its related connectors 22 upon the appropriate occurrence of operator commands.

The practice of the present invention may also develop fog beam illumination by choosing the appropriate parameters and cooperation of device 20, optical member $26_C$ and lens elements $28_1 \ldots 28_N$ all generally illustrated in FIG. 2. For example, the lens elements 28 located in the central frontal area of the vehicle may be selected to transmitted the fog beam illumination, and connectors 22 proximate to the selected central lens elements may be selected to supply the related generated light, whereas, the associated sections of optical member $26_C$, similar to $26_{11}$ and $26_{12}$ previously discussed, may have appropriate parameters, such as the color yellow, selected to develop the desired fog beam illumination. For such illumination, the operation of device 20 is selected so that optical member $26_C$ is moved in and out of imposition with its related connectors 22 upon the appropriate occurrence of operator commands.

It should now be appreciated that the practice of the present invention having various flat and wedge optical imposition embodiments provide for a single high intensity light source that generates the light energy for the fog light illumination, and the forward illumination including low and high beams along with cornering illumination.

It should be further appreciated that the optical member $26_{11}$ or $26_{12}$ may be interposed between the connectors $22_1 \ldots 22_n$ of the optical fibers having ends for emitting light and the lens elements $28_1 \ldots 28_n$ in a linear manner or the optical member $26_{11}$ may be so interposed in a rotated manner. The amount of derivation between the real and apparent positions of the light emitting optical fibers of connectors $22_1 \ldots 22_n$, relative to the lens elements $28_1 \ldots 28_n$ transmitting the low and high beam illumination patterns, is a function of the parameters selected for the optical members $26_{11} \ldots 26_{nn}$.

What we claim as new and desire to secure by Letters Patent of the United States is:

1. A lighting subsystem for a vehicle comprising:
   (a) a high intensity light source capable of being selectively energized;
   (b) a plurality of optical carrying devices each having one end predeterminedly coupled to said light source with the other end of each of the optical fibers emitting light upon activation of said high intensity light source;
   (c) a plurality of lens elements positioned relative to the ends of the respective optical carrying devices and being mountable in the frontal area of said vehicle;
   (d) means including a moveable light transmitting device capable of being imposed between said ends of the respective optical carrying devices and lens elements, said imposition altering the apparent optical position of said ends of the optical carrying devices relative to said lens elements; and
   (e) means for moving said device to a selected position to alter the pattern of light transmitted to said lens.

2. A lighting system according to claim 1 wherein said moveable device is of a wedge shape having a predetermined wedge angle, a predetermined thickness and a predetermined index of refraction, the amount of altering of said apparent optical position of said ends of the optical carrying devices increasing as a function of said wedge angle, said thickness, and said index of refraction.

3. A lighting system according to claim 1 wherein said moveable device is of a flat shape having a predetermined thickness and a predetermined index of refraction, the amount of altering of said optical position increasing as a function of said thickness and said index of refraction.

4. A lighting system according to claim 1 wherein said moveable device is of a flat shape having a predetermined thickness and a predetermined index of refraction, said moveable device being imposed between said optical carrying devices and said lens elements and rotated to various angles relative to the optical axis of said respective lens element, the amount of altering of said apparent optical position increasing as a function of said angle of rotation, said thickness, and said index of refraction.

5. A lighting system according to claim 1 wherein said altering of said apparent optical position of said ends of said optical carrying devices is selected so that the illumination transmitted from said lens elements upon energization of said high intensity discharge lamp is changed from a first pattern to a second pattern.

* * * * *